Patented Jan. 25, 1949

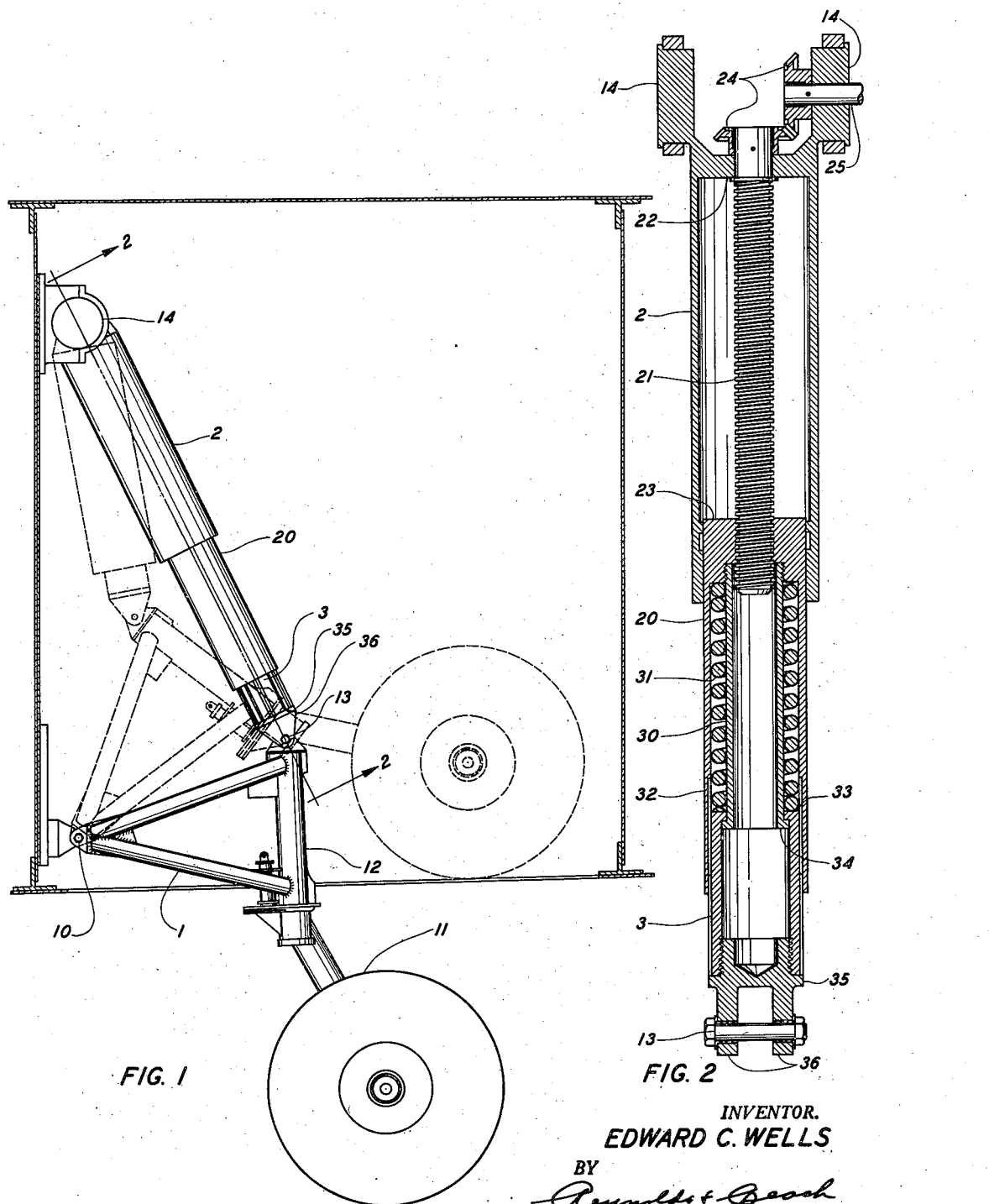

2,459,982

UNITED STATES PATENT OFFICE 2,459,982

RETRACTABLE SHOCK ABSORBING STRUT

Edward C. Wells, Seattle, Wash., assignor to Boeing Airplane Company, a corporation of Delaware Application December 13, 1944, Serial No. 568,030

7 Claims. (Cl. 244—102)

The strut incorporating my invention is particularly useful for application to airplane tail wheel mountings.

It has been customary heretofore to support airplane tail wheels resiliently, and a typical construction is shown in Monteith Patent No. 1,856,778 issued May 3, 1932.

A principal object of my invention is to provide a shock absorbing strut which can be connected to a tail wheel mounting of the general type disclosed in the aforesaid patent, enabling it to be retracted within the confines of the airplane fuselage while at the same time preserving its cushioning characteristics. Because of its compact arrangement my strut may be substituted directly for the resilient strut in the tail wheel mounting of the above patent, with perhaps only a slight change in the anchoring structure for the upper end of the strut. Nevertheless the resilience of the gear is not reduced appreciably. In fact, the shock absorbing qualities of such a tail wheel assembly incorporating my strut are almost as good when the tail wheel is in a position intermediate its extended position and its retracted position as when it is in the fully extended position.

Substitution of my strut to permit retraction of a tail wheel such as shown in the patent does not interfere with the steerable characteristics of the tail wheel. The construction of the strut is simple, and it is composed of few parts. Although light, the structure is strong and is protected against infiltration of dirt which might interfere with its operation. The strut may be removed and disassembled readily for cleaning or repair, if such should be necessary.

The preferred construction of my strut shown in the drawings may be modified in minor particulars as may be required for installations of different types.

Figure 1 is a side elevational view of an airplane tail wheel installation incorporating my strut.

Figure 2 is a longitudinal sectional view through the strut taken along line 2—2 of Figure 1.

A conventional tail wheel structure, similar to that shown in Patent 1,856,778 mentioned above, includes a rigid frame 1 of double wedge shape, having a forward horizontal apex ridge member pivoted at 10 to the fuselage just inside its lower surface. The wheel 11 has a spindle received in the upright post 12 forming the rearward apex ridge. The spindle is journaled suitably in the post to permit swiveling of the tail wheel. Upward swinging of the frame and wheel about pivot 10 is resisted by the resilience of the shock strut.

The lower end of my strut is pivoted by a bolt 13 to the upper end of post 12, and its upper end is supported for swinging about a horizontal axis by trunnions 14 located considerably above the frame pivot 10. Preferably such trunnions are substantially directly above pivot 10, but this relationship is not essential.

My strut is not only resilient, but is variable in effective length, so that as it is shortened frame 1 and wheel 11 carried by it are swung upward about pivot 10 to retract the wheel into the position within the fuselage shown in broken lines in Figure 1.

While the resilient mechanism incorporated in the strut may be of different types, and although the mechanism for varying the length of the strut may be modified, I prefer that the strut incorporate an outer tube 2 and an inner tube 20 disposed in telescoping relationship, as shown in Figure 2. The upper end of such outer tube is secured to trunnions 14 so that as the strut is shortened its lower end may swing forward, as shown in broken lines in Figure 1. Such telescoping tubes perform the dual function of protecting the interior mechanism from dirt, and of relieving the retracting mechanism from any bending loads to which the strut may be subjected.

Tube 20 is drawn into the open lower end of tube 2 to reduce the length of the strut by rotation of screw 21, the upper end of which is journaled in wall 22 closing the upper end of tube 2. Endwise movement of the screw is thus prevented, whereas its lower end is threaded into wall 23 closing the upper end of the inner tube 20 and serving as a nut, movable lengthwise of the screw to swing wheel supporting frame 1. The upper end of this screw projecting through wall 22 may be rotated by any convenient drive mechanism, such as bevel gears 24 driven by an actuating device, which may be a motor or a flexible shaft and crank, connected to rotate shaft 25. This shaft extends concentrically through one of the trunnions 14 so that the driving connection between such shaft and screw 21 is not interrupted by swinging the strut upon its trunnions. In all rotated positions of the screw it acts as a true rigid strut element to resist endwise tension, compression and bending loads. The tube 2 also assists in resisting bending loads to keep the strut straight.

Within tube 20 is received a second pair of telescoping tubes, including a relatively outer tube 3 and an inner tube 30. Tube 20 is then actually an intermediate tube, between the covering tube 2 and the shock absorbing mechanism. The upper end of tube 30 is screwed into or otherwise secured to and carried by the upper end wall 23 of tube 20. Tubes 20 and 30 thus, in effect, are one integral part and could be formed as a single unit if desired, or tube 30 could even be omitted entirely, although it would be necessary to alter certain features of the contruction in either of such cases. The annular space between tubes 20 and 30 receives a spring 31 encircling tube 30 and engaged between the end wall 23 of tube 20 and the inner end of tube 3, which provides resilience for the shock absorber.

Splines 32, engaged between the overlapping portions of tubes 3 and 20, prevent relative rotation of these tubes. In the preferred form of my device endwise separation of tubes 3 and 30 is prevented by the engagement of an inwardly directed flange 33 on the inner end of tube 3 with an outwardly directed flange 34 on the lower end of tube 30. Movement of tube 3 inwardly relative to tube 20 is limited either by compression of spring 31 to its full extent, or by engagement of the inner end of tube 3 with the end of the splined portion of tube 20.

The lower end of tube 3 is preferably closed by a removable cap 35. This cap carries strut connecting means, including lugs 36 apertured for reception of pivot bolt 13 which interconnects the lower end of the strut and the upper end of frame post 12.

It will be noted that cap 35 is hollow and that the interiors of tubes 3 and 30 are unobstructed. All of these cavities are of a size in cross section exceeding the maximum cross section of screw 21, and are aligned with such screw. As shown in Figure 2, when the strut is in its fully extended condition the lower end of screw 21 does not extend appreciably below the end wall 23 of tube 20. As the strut is contracted to retract the wheel 11 by upward movement of tube end 23, the screw projects axially first into the interior of tube 30, then into the interior of tube 3, and finally perhaps even into the cavity of cap 35. The provision of a hollow shock absorbing structure which enables the strut length adjusting means to be housed completely within it, even when the resilient mechanism is under maximum compression, is primarily responsible for the compact arrangement of my strut which enables it to be substituted directly for a conventional shock absorbing strut which cannot be shortened to retract the tail wheel.

In assembling my strut, spring 31 may be inserted into tube 20 and held in place by sliding tube 3 into the lower end of the former tube with the splined structure 32 properly engaged. Tube 30, if such a tube is used, may then be inserted through the open lower end of tube 3, and while the latter tube is forced inward against the resistance of spring 31 to remove pressure by its flange 33 on flange 34 of tube 30, such tube may be screwed into the end wall 23 of tube 20 to hold the tubes in assembled relationship. Extension of the spring is then limited by engagement of the flanges 33 and 34. Cap 35 may now be screwed into the lower end of tube 3.

When screw 21 is assembled in tube 2 trunnions 14 may be mounted in their bearings on the airplane structure. After supporting frame 1 by its pivot 10, bolt 13 may be inserted to interconnect the strut mounting lugs 36 with the upper end of frame post 12. The upper end of tube 20 may then be started into the lower end of tube 2 and screw 21 rotated to thread it into the internally threaded hole in tube end 23. With the strut parts thus assembled a stop may be interengaged between tubes 2 and 20, or the rotation or axial travel of screw 21 may be limited, to prevent extension of the strut sufficiently to disengage the screw and nut during normal movement of the wheel 11 to extended position.

It will be evident that the cushioning action of spring 31 between tubes 3 and 20 is not altered as the length of this strut is changed by shifting tube 20 relative to screw 21. Consequently the shock of contact between wheel 11 and the ground would be cushioned by the spring 31 even though the wheel were not in its fully down position. The resilient characteristics of the gear are somewhat better, however, when the wheel is fully extended, because in that condition the resilient strut is substantially perpendicular to a line joining pivots 10 and 13. Any force tending to swing frame 1 about pivot 10 would therefore act on the strut in direct compression.

When the angle between a line through pivots 10 and 13 and the strut axis is increased, however, as shown in the broken line position of the parts in Figure 1, force exerted on the frame acts partially to compress the strut and partially in tension on the longer members of frame 1. Under emergency conditions, however, considerable resilience will be afforded even though the strut is not fully extended.

I claim as my invention:

1. A strut comprising a tube having a closed end, hollow shock absorbing means received in said tube, strut mounting means received in the open end of said tube, engaged with said shock absorbing means, and movable inwardly relative to said tube against the resilience of said shock absorbing means, a screw threaded in the closed end of said tube and projectible within said tube and shock absorbing means, and second strut mounting means engaged with the portion of said screw exteriorly of said tube for movement thereby lengthwise of said tube to reduce the effective length of said strut as said screw is projected into the hollow of said shock absorbing means.

2. A strut comprising a tube having a closed end, a spiral spring received in said tube and having one end engaged with the closed end thereof, strut mounting means received in the open end of said tube, engaged with the other end of said spring, and movable inwardly relative to said tube against the resilience of said spring, a screw threaded in the closed end of said tube and projectible within said tube and spiral spring, and second strut mounting means engaged with the portion of said screw exteriorly of said tube for movement thereby lengthwise of said tube to reduce the effective length of said strut as said screw is projected into said spiral spring.

3. A strut comprising an outer tube, an inner tube slidably received within said outer tube, means extending axially of said inner and outer tubes generally centrally thereof, interconnecting said tubes and operable to shift them lengthwise relative to each other between extended and contracted positions, resilient means housed in said inner tube, adapted to encircle said tube interconnecting means in contracted relationship of said tubes, and strut mounting means carried by said inner tube in position for engagement with said resilient means to cushion movement of said mounting means relative to said inner tube in a direction toward said outer tube.

4. A strut comprising an outer tube, an inner tube slidably received within said outer tube, a screw extending axially of said inner and outer tubes generally centrally thereof, interconnecting said tubes and operable to shift them lengthwise relative to each other between extended and contracted positions, a spiral spring housed in said inner tube, adapted to encircle said screw in contracted relationship of said tubes, and strut mounting means carried by said inner tube in position for engagement with said spring to cushion movement of said mounting means relative to said inner tube in a direction toward said outer tube.

5. A strut comprising an outer tube closed at one end, an intermediate tube having a closed end slidably received in the open end of said outer tube, a screw extending axially through said outer tube and having one end journaled in the closed end of said outer tube and its other end threaded into the closed end of said intermediate tube, drive means operable to rotate said screw for moving said outer tube and said intermediate tube relatively lengthwise, an inner tube having its open end slidably received within the open end of said intermediate tube for reception of the end of said screw when said outer tube and said intermediate tube are in contracted relationship, strut connecting means carried by said inner tube, and resilient means disposed within said intermediate tube, engaged by said inner tube and yieldable to cushion shocks transmitted to the strut through said connecting means.

6. A strut comprising an outer tube closed at one end, an intermediate tube having a closed end slidably received in the open end of said outer tube, a screw extending axially through said outer tube and having one end journaled in the closed end of said outer tube and its other end threaded into the closed end of said intermediate tube, drive means operable to rotate said screw for moving said outer tube and said intermediate tube relatively lengthwise, an inner tube having its open end slidably received within the open end of said intermediate tube for reception of the end of said screw when said outer tube and said intermediate tube are in contracted relationship, strut connecting means carried by said inner tube, and a spiral spring disposed within said intermediate tube, engaged by said inner tube and yieldable to cushion shocks transmitted to the strut through said connecting means.

7. A strut comprising a tube, elongated resilient means, received in said tube and having one end engaged therewith, and providing an elongated cavity therein, strut mounting means engaging the other end of said resilient means, and movable lengthwise of said tube against the resistance of said resilient means, second strut mounting means, and an elongated rigid connecting member carrying said second strut mounting means, having a thrust connection with said tube, and movable into the elongated cavity therein said resilient means to reduce the effective length of said strut.

EDWARD C. WELLS.

REFERENCES CITED

The following references are of record in the file of this patent:

UNITED STATES PATENTS

| Number | Name | Date |
| --- | --- | --- |
| 1,490,513 | Janin | Apr. 15, 1924 |
| 1,842,776 | Bogoslowsky | Jan. 26, 1932 |
| 2,213,967 | Roche | Sept. 10, 1940 |
| 2,238,411 | Conklin | Apr. 15, 1941 |